United States Patent [19]
Kassekert et al.

[11] 3,915,251
[45] Oct. 28, 1975

[54] ELECTRIC VEHICLE DRIVE UTILIZING A TORQUE CONVERTER IN CONJUNCTION WITH A FIELD CONTROLLED MOTOR

[75] Inventors: David W. Kassekert; Richard A. Elco, both of Pittsburgh; James A. Bauer, Murrysville, all of Pa.

[73] Assignee: Westinghouse Electric Corporation, Pittsburgh, Pa.

[22] Filed: Mar. 29, 1973

[21] Appl. No.: 346,199

[52] U.S. Cl. .................. 180/65 R; 105/50; 318/12; 318/84; 318/97; 318/139; 318/358; 318/428
[51] Int. Cl.² .................. B60L 11/00; B60L 15/04; B60L 15/20
[58] Field of Search ........ 180/65 R, 60; 318/12, 11, 318/9, 139, 521, 358, 357, 423, 428, 533, 350, 84, 97, 81; 105/49, 50

[56] References Cited
UNITED STATES PATENTS

| | | | |
|---|---|---|---|
| 1,139,882 | 5/1915 | Markle | 180/65 R UX |
| 1,238,516 | 8/1917 | Henderson et al. | 318/428 X |
| 2,993,550 | 7/1961 | Klappert | 180/65 R X |
| 3,190,387 | 6/1965 | Dow | 180/65 R |
| 3,373,316 | 3/1968 | Palmer | 180/65 R X |
| 3,424,261 | 1/1969 | Sheldon | 180/65 R X |

FOREIGN PATENTS OR APPLICATIONS

| | | | |
|---|---|---|---|
| 613,516 | 11/1948 | United Kingdom | 180/65 R |

*Primary Examiner*—Kenneth H. Betts
*Assistant Examiner*—Milton L. Smith
*Attorney, Agent, or Firm*—H. G. Massung

[57] ABSTRACT

An electric vehicle drive is provided utilizing field control of a direct current drive motor in conjunction with a torque converter to vary the speed of the electric vehicle. Control of the shunt field of the direct current drive motor is used to vary the speed of the drive motor and hence the vehicle between some maximum speed and a predetermined minimum base speed. A torque converter is used in conjunction with the field controlled motor to control electric vehicle speeds from a dead stop to the predetermined base speed, while the direct current drive motor is operated at approximately the base speed.

5 Claims, 5 Drawing Figures

ELECTRIC VEHICLE DRIVE UTILIZING A TORQUE CONVERTER IN CONJUNCTION WITH A FIELD CONTROLLED MOTOR

CROSS REFERENCE TO RELATED APPLICATION

This application is related to application Ser. No. 346,552 filed Mar. 30, 1973.

BACKGROUND OF THE INVENTION

This invention relates to electric vehicles and more particularly to the speed control system utilized in an electric vehicle.

In most prior art electric vehicle speed control systems a direct current (DC) chopper-control and a series wound drive motor are used. The chopper is placed in series between a DC power source and the series wound drive motor. The DC chopper-controls the speed of the DC series motor by controlling and interrupting the full armature current. The speed of the series wound motor can be varied by varying the magnitude and time of the DC pulses of current applied to the armature of the series drive motor. The DC chopper-control and series motor are at present the most commonly used approach to electric vehicle speed control.

In a vehicle powered by a conventional DC series traction motor the motor may be direct coupled to the drive wheel of the car. This is possible because the normal DC armature current chopper provides complete control of the speed of the drive motor over its entire range, thus allowing the motor to be operated down to zero output speed. Since the chopper must control, conduct, and interrupt the full armature current it must of necessity be of sufficient size to handle the large load current flow. One of the primary problems with the conventional drive system is the bulky and expensive DC chopper required in the armature circuit. Another problem with the conventional DC chopper and series wound drive motor is the rather poor efficiency under normal operating conditions.

SUMMARY OF THE INVENTION

An electric vehicle drive is provided having a DC drive motor utilizing shunt field control to vary the speed of the electric vehicle between a predetermined base speed and speeds greater than the predetermined base speed. The speed of the direct current drive motor can be varied between a maximum and a predetermined base speed. At electric vehicle speed where the drive motor is operated at greater than base speed, the electric vehicle speed is directly related to the speed of the drive motor. A torque converter is used in conjunction with the DC drive motor to provide control of the speed of the electric vehicle between zero and the predetermined base speed. The predetermined base speed of the electric vehicle corresponds to the base speed of the drive motor. To reduce the size, cost and complexity of the prior art controller, which utilizes DC choppers, a shunt field controlled drive motor is utilized.

In the disclosed invention only the small current to the shunt field of the motor is controlled permitting a large reduction in the cost and weight of the speed control system. As described above shunt field control, however, only allows control of the drive motor speed from the base speed to a maximum motor speed. That is, there is some drive motor speed below which operation by field control is not possible. A torque converter is provided to permit control of the electric vehicle from stand still to the speed corresponding to the base speed of the drive motor. When speeds less than that corresponding to the base speed of the drive motor are required the DC drive motor is operated at speeds slightly above the predetermined base speed in a torque controlled mode. The torque converter slip and torque multiplication allows the vehicle to operate at steady speeds between zero and the vehicle speed corresponding to the base speed of the motor.

The disclosed drive system also allows elimination of a differential by having a torque converter drive conveying power to each of the drive wheels. As the drive wheels speeds change, in cornering for example, the torque converters change slightly in ratio thus allowing different drive wheel speeds for a single drive motor speed. In a rear wheel drive vehicle a single drive motor mounted across the back of the vehicle and having a double ended drive shaft or separate drive motors for each rear drive wheel can be used.

The disclosed drive system is more efficient than a conventional controller utilizing a DC chopper for the armature current. The disclosed construction of electric vehicle drive system features simple control, inherent reliability, safety, and high efficiency.

The shunt field control for the DC drive motor can be of the variety providing analog control of the field current, through a direct current or a chopper powered amplifier. Such a field control is described in copending application U.S. Pat. Office Ser. No. 346,552.

It is an object of this invention to provide an electric vehicle speed control system which is more reliable, less expensive and more efficient than the DC chopper variety of controller used in prior art electric vehicles.

It is a further object of this invention to provide a speed control system for an electric vehicle utilizing a field control DC motor in conjunction with a torque converter to efficiently control the speed of an electric vehicle over the entire speed range.

It is still a further object of this invention to provide for speed control of an electric vehicle without switching large currents.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
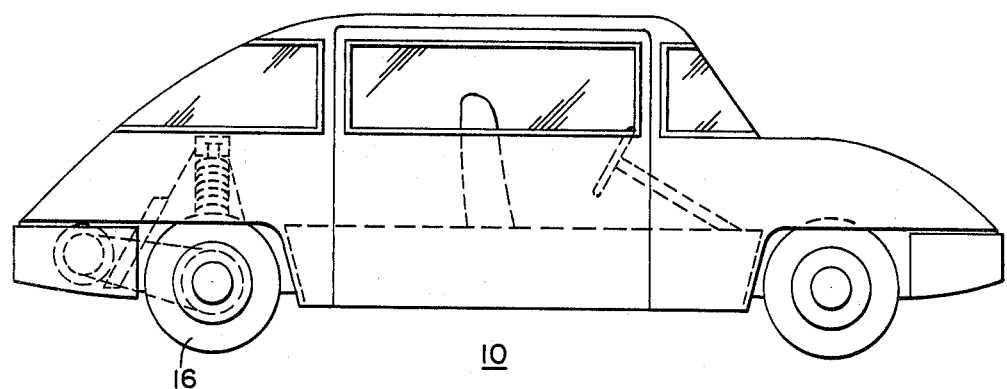
FIG. 1 is a side view of an electric vehicle utilizing the teachings of the present invention.
Figure 2:
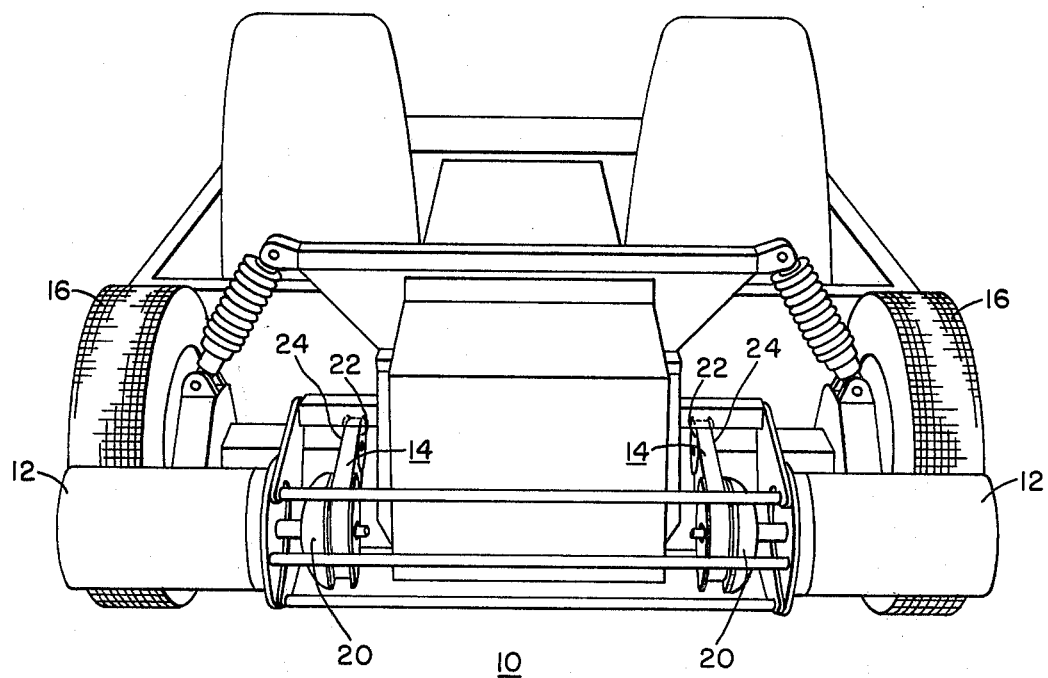
FIG. 2 is a rear view of the electric vehicle shown in FIG. 1 with portions deleted for clarity.
Figure 3:
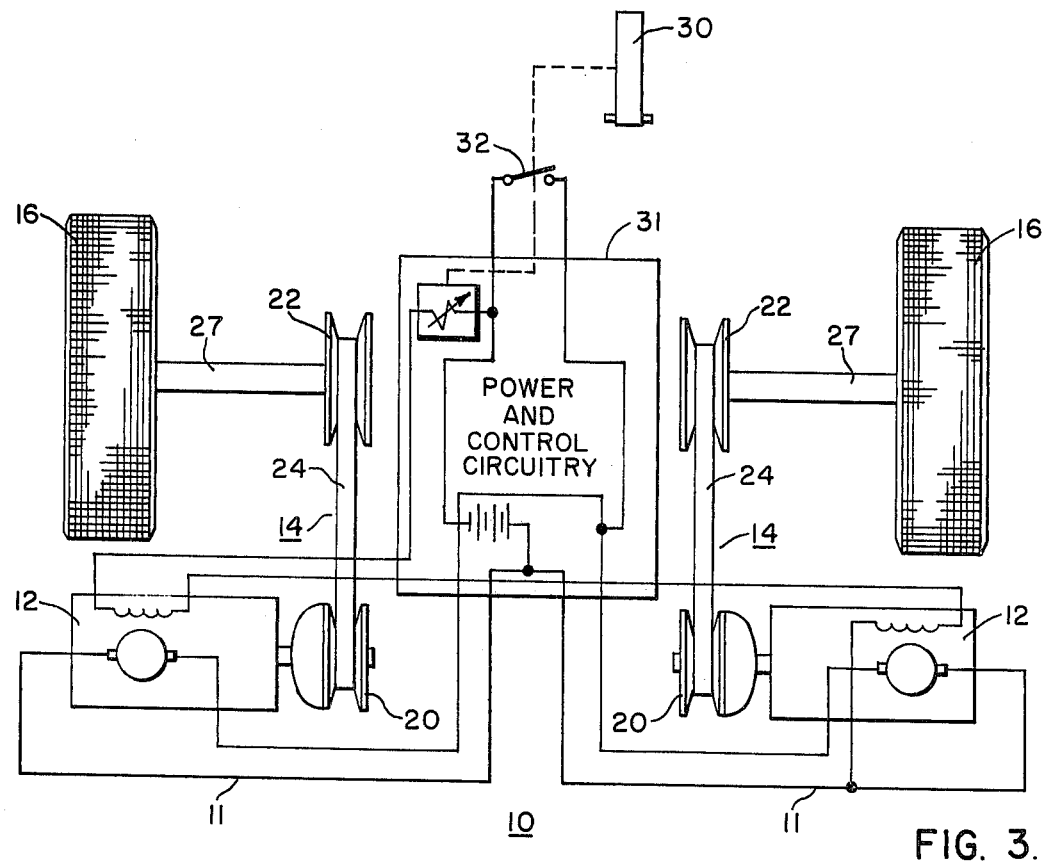
FIG. 3 is a top view of a portion of the electric vehicle shown in FIG. 2.

Referring now to the drawings, in FIGS. 1, 2 and 3 in particular there is shown an electric vehicle 10 utilizing the teaching of the present invention. To reduce the size and complexity of the prior art speed controllers a shunt field controlled motor 12 is used in conjunction with a torque converter 14. The shunt field control is preferably of a type utilizing variable rate regenerative braking as disclosed in copending application U.S. Pat. Office No. 346,552 entitled "ELECTRIC VEHICLE HAVING PROGRAMMED FIELD CONTROL OF SEPARATELY EXCITED DC DRIVE MOTOR" by Richard A. Elco.

By using shunt field control only the small current to the field of the drive motor 12 is controlled permitting a large reduction in cost and weight of the speed control system. However, field control of the DC drive motor 12 can only be utilized for varying speed of the drive motor 12 between some predetermined base speed and a maximum permissible motor speed. That is, there is some motor speed, the predetermined base speed, below which operation of the DC drive motor 12, by shunt field control, is not possible. For proper driveability of the electric vehicle 10 a torque converter 14 is provided to permit control of the vehicle speed from a dead stop to a speed corresponding to the base speed of the DC drive motor 12. When the drive motor 12 is operated at speeds greater than the predetermined base speed, the speed of drive wheel 16 is directly related to the speed of drive motor 12.

The torque converter 14 can be centrifugally actuated V-belt torque converter of a type well known in the art and readily available commercially. The Salsbury Corporation, Los Angeles, California manufactures an acceptable torque converter 14 for practicing this invention. At speeds less than those corresponding to the base speed of the DC drive motor 12 the torque converter 14 provides for speed control of the electric vehicle 10. At these slower speeds the electric drive motor 12 is operated slightly above the base speed at a controlled torque. The torque converter 14, acts as a slipping clutch at vehicle speeds below the vehicle speed corresponding to the base speed of the motor and provides additional speed range by means of a variable gear ratio. In the disclosed invention the DC drive motor 12 drives the torque converter 14 which is mechanically connected to drive wheel 16 which contacts the ground and moves the vehicle 10.

The torque converter 14 comprises a drive pulley 20 and a driven pulley 22 connected by drive belt 24. Driven pulley 22 is connected to output or driven shaft 27, which transmits power from driven pulley 22 to drive wheel 16. Shaft 27 is rigidly attached to pulley 22 and rotates at the same speed as pulley 22. Although the invention is described utilizing a centrifugally activated V-belt torque converter 14 it should be understood that other types of torque converters, such as hydraulic or the like, can also accomplish the same result.

The vehicle 10 shown in FIG. 3 is powered by two separate drive motors 12 supplying power to drive wheels 16 through two variable ratio V-belt torque converter 14. A simple control mechanism as described more fully in copending patent application, U.S. Pat. Office No. 346,552 senses accelerator pedal position and motor current and adjusts the motor field accordingly. During deceleration or when descending grades the motor field is increased thereby providing for controlled variable rate regenerative braking. The V-belt drive provides a 3 to 1 torque multiplication for starting, and eliminates the need for a differential. An additional gear reduction ratio can be provided by a wheel mounted gear reducer.

When the electric vehicle 10 is stationary the drive motor 12 is shut off. As the accelerator pedal 30 is initially depressed a switch 32, mechanically linked to accelerator 30, closes and actuates the power and control circuitry 31 supplying power to the DC drive motor 12. Power and control are supplied to motor 12 through electric cables indicated schematically as lines 11. During initial acceleration, after pedal 30 is depressed, drive motor 12 is running at base speed. Engagement speed of the torque converter 14 is set to be slightly higher than the base speed of the drive motor 12. During starting, as the accelerator 30 is depressed, the motor 12 increases its speed slightly above the base speed and the torque converter begins to transmit torque to the drive wheels 16. As the vehicle 10 accelerates from a dead stop to a speed corresponding to the base speed of the drive motor 12 the torque converter 14 slips thus allowing the drive motor 12 speed to remain constant at substantially the base speed. When the torque converter 14 stops slipping the motor 12 increases in speed beyond base speed and centrifugal weights in the torque converter 14, in a manner well known in the art, cause the gear ratio to change to a one to one ratio. Thus the torque converter 14 provides a high torque multiplication at speeds less than or equal to vehicle base speed and changes to a one to one ratio at higher motor speeds.

Figure 4:
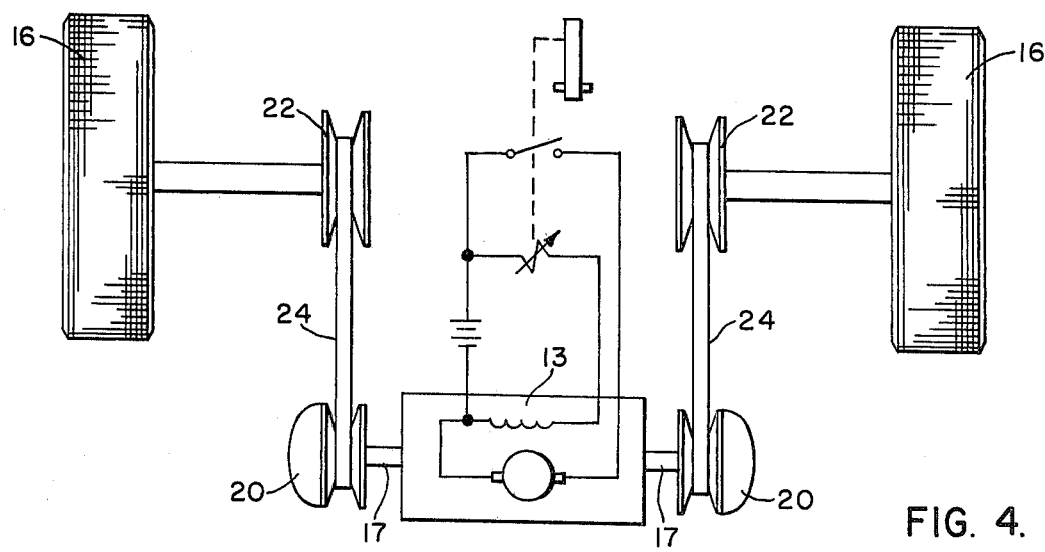
FIG. 4 is a top view similar to FIG. 3 but showing a portion of an electric vehicle having one rear drive motor with a double ended drive shaft.

The disclosed invention also allows elimination of a differential by having a torque converter 14 drive to each drive wheel 16. As the speeds of wheels 16 change in cornering the torque converters 14 change slightly in ratio thus allowing different wheel speeds for a single motor speed. This can work with a single motor 13, having a double ended shaft 17 as shown in FIG. 4, mounted across the back of the electric vehicle 10 and directly connected to the two driver pulleys 20. This will also work with a separate motor 12 for each drive wheel 16 as shown in FIG. 3. For two drive motors 12, as shown in FIG. 3, if the armatures are connected in parallel, and the field windings are connected in series, identical motor speeds will be obtained.

Figure 5:
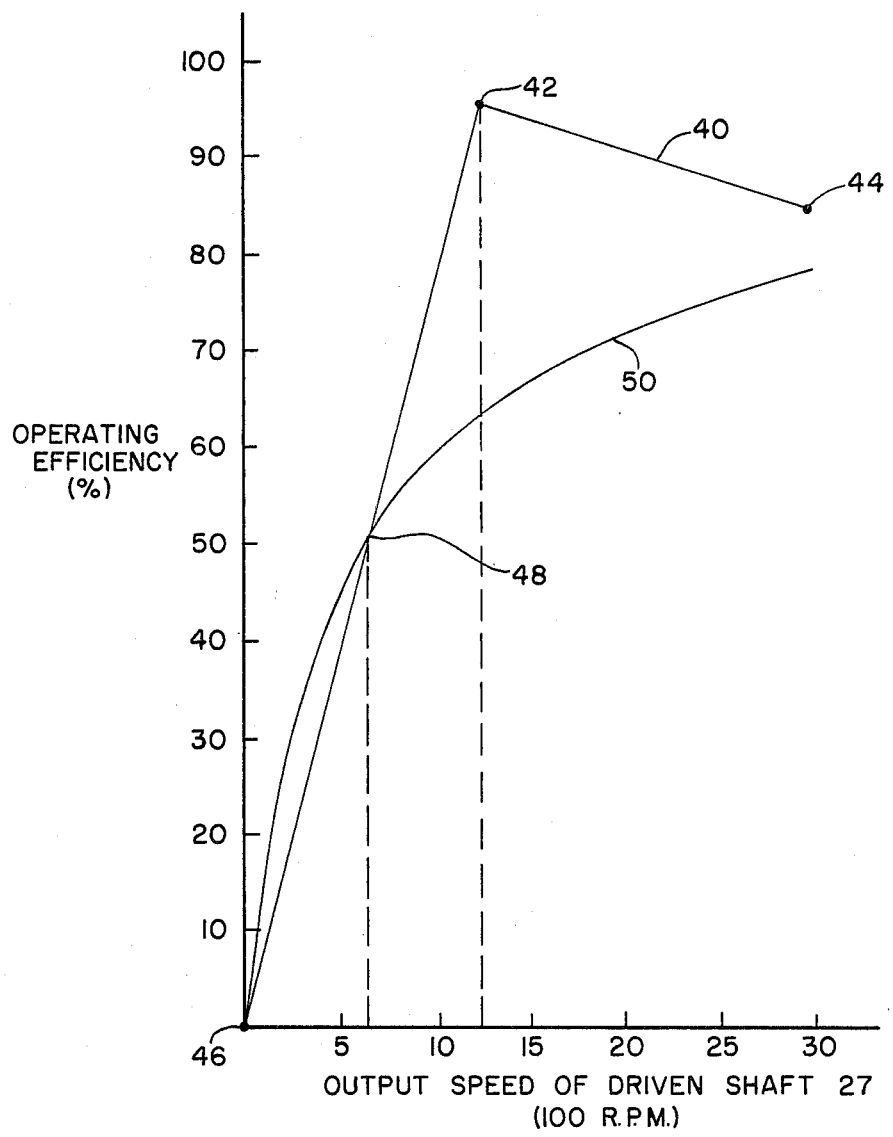
FIG. 5 is a graph showing the efficiency of a chopper controlled motor system with the torque converter and field control motor system of the present invention.

The speed control system disclosed in the instant application is also more efficient than a conventional prior art controller utilizing a DC chopper. Referring now to FIG. 5 there is shown a graph illustrating operating efficiency versus output shaft RPM of both a DC chopper-controlled motor system, curve 50, and a torque converter and field control motor system, curve 40, as described in the instant application. This graph, shown in FIG. 5, represents two drive motors 12 of the same size running in a constant torque mode. For the chopper-controlled motor curve 50 is obtained by running at a fixed current up to 3000 RPM. For the field controlled motor, curve 40, constant torque is obtained until the torque converter 14 stops slipping then the throttle 30 is manipulated to maintain constant torque. Curve 40 illustrates efficiency of the torque converter and field controlled motor system. The base speed of the field controlled motor in this instance is approximately 1200 RPM and is indicated at the knee of curve 40 at point 42. Maximum output RPM of the torque converter and field controlled motor system is indicated at 44. Between base speed represented by point 42 and maximum speed represented by point 44 the speed of the drive motor 12 is controlled by varying the shunt field of the DC drive motor 12. When the speed of electric vehicle 10 drops below point 42 corresponding to the base output speed the DC drive motor 12 is operated at the base speed and the speed of the output shaft 27 is then controlled by the slip and torque multiplication characteristics of the torque converter 14. Between point 46 representing zero output speed of the electric vehicle 10 and point 42 where electric vehicle 10 speed corresponds to the base speed of the drive motor 12 the speed of the output shaft 27 and the electric vehicle 10 is controlled by torque converter slip and torque multiplication. As can be seen for electric vehicle 10 operating speeds above approximately 600 RPM of the output shaft 27, indicated by point 48, the efficiency of the torque converter and field controlled motor system is substantially greater than the prior art chopper-controlled motor system. The curve 50 for the prior art chopper-controlled motor system intersects curve 40 at point 48 and for any higher operating speeds the efficiency of the chopper-controlled motor system is less than the field control motor system. It can be seen for most operating speeds the efficiency of the field controlled motor system indicated by curve 40 is greater than the efficiency of chopper control system represented by curve 50. Since the torque converter and the field controlled motor system do not interrupt the main armature current the controller can be small and fairly simple. The disclosed electric vehicle speed control system features high efficiency, simple controls, inherent reliability and safety, and variable rate regenerative braking. The disclosed system can be made smaller, less costly, more efficient, and more reliable than the prior art DC chopper-type control.

We claim:

1. A drive for an electric vehicle comprising:
 a throttle;
 a direct current drive motor having a shunt field which can be separately excited;
 a direct current power supply directly connected to said direct current drive motor;
 shunt field control means electrically connected to the shunt field of said direct current drive motor for varying the shunt field of said direct current drive motor, in response to positioning of said throttle, to vary the speed of said direct current drive motor from a maximum speed to a predetermined base speed;
 drive wheel means for said electric vehicle to move said electric vehicle as said drive wheel means is rotated; and,
 torque converter means connected between said direct current drive motor and said drive wheel means for providing a fixed direct ratio between the speed of said direct current drive motor and said drive wheel means for driving said electric vehicle at a speed directly related to the speed of said direct current drive motor when said direct current drive motor is operated at a speed greater than the predetermined base speed, and for providing a variable ratio between the speed of said direct current drive motor and said drive wheel means for driving said electric vehicle at a speed not proportional to the speed of said direct current drive motor when said direct current drive motor is operated at the predetermined base speed.

2. A drive system for an electric vehicle as claimed in claim 1, wherein:
 said direct current drive motor comprises, a double-ended drive shaft extending generally across the back of the electric vehicle; and including,
 a pair of torque converters each of which is connected to one end of the double-ended drive shaft.

3. A drive system for an electric vehicle as claimed in claim 1 wherein said shunt field control means supplies a continuous current to the shunt field of said direct current drive motor and varies the magnitude of the continuous current to change the speed of said direct current drive motor.

4. A drive for an electric vehicle comprising:
 a throttle positionable between a raised position and a depressed position;
 a plurality of direct current drive motors, each having an armature and a shunt field which can be separately excited;
 shunt field control means electrically connected to the shunt field of each of said direct current drive motors for varying the shunt field of said direct current drive motors in response to positioning of said throttle to vary the speed of said direct current drive motors from a maximum speed to a predetermined base speed;
 a fixed direct current power supply directly connected to the armatures and connected to the shunt fields through said shunt field control means;
 a throttle switch, linked to said throttle, interrupting power to said plurality of direct current drive motors when said throttle is in the raised position;
 a plurality of drive wheels each associated with one of said plurality of direct current drive motors for moving said electric vehicle; and,
 a plurality of torque converter means each being connected between one of said plurality of direct current drive motors and said associated drive wheel providing a fixed ratio connection for moving said electric vehicle at a speed directly related to the speed of said plurality of direct current drive motors when said direct current drive motors are operated at a speed greater than the predetermined base speed and providing a variable ratio connection for driving said electric vehicle at a speed greater than the predetermined base speed and providing a variable ratio connection for driving said electric vehicle at a speed not proportional to the speed of said direct current drive motors when said direct current drive motors are operated at the predetermined base speed.

5. A drive for an electric vehicle as claimed in claim 4 wherein:
 the armature windings of each of said plurality of direct current drive motors being connected in parallel and being supplied with power from said direct current power source and the shunt fields of each of said direct current drive motors being connected in series and being supplied with excitation current from said shunt field control means.

* * * * *